(12) United States Patent
Alperovich et al.

(10) Patent No.: US 6,269,244 B1
(45) Date of Patent: Jul. 31, 2001

(54) ENHANCED CELLULAR NETWORK ARCHITECTURE

(75) Inventors: Vladimir Alperovich, Dallas; Theodore Havinis, Richardson, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/401,601

(22) Filed: Sep. 22, 1999

(51) Int. Cl.[7] ........................................ H04Q 7/20
(52) U.S. Cl. ..................... 455/433; 455/435; 455/560; 370/328; 370/338
(58) Field of Search ..................... 455/432, 433, 455/419, 435, 560, 507; 370/328

(56) References Cited

U.S. PATENT DOCUMENTS

| | | | |
|---|---|---|---|
| 5,511,111 | * | 4/1996 | Serbetcioglu et al. ............ 379/67 |
| 5,610,974 | * | 3/1997 | Lantto ............................ 379/59 |
| 5,901,352 | * | 5/1999 | St-Pierre et al. ................ 455/426 |
| 5,978,672 | * | 11/1999 | Hartmaier et al. .............. 455/413 |
| 6,049,714 | * | 6/2000 | Patel .............................. 455/433 |
| 6,064,887 | * | 5/2000 | Kallioniemi et al. ............ 455/445 |
| 6,073,015 | * | 6/2000 | Berggren et al. ................ 455/432 |
| 6,081,712 | * | 6/2000 | Buettner ......................... 455/433 |

* cited by examiner

Primary Examiner—Edward F. Urban
Assistant Examiner—Marceau Milord
(74) Attorney, Agent, or Firm—Jenkens & Gilchrist, P.C.

(57) ABSTRACT

A telecommunications system and method is disclosed for an enhanced cellular network architecture to distributively store subscriber data and provide application platforms for custom applications. In addition to or in place of the current subscriber data, a new element can be stored in the HLR. This new element references one of a plurality of databases distributed throughout a data network, such as the Internet Protocol (IP) network. These databases may contain additional subscriber data or custom applications for mobile subscribers. The elements inform the serving MSC/VLR which database to access in order to obtain the additional subscriber data. In addition, the MSC/VLR may also be connected to a dedicated local database through an intranet. This local database preferably stores a local copy of the subscriber data or custom applications retrieved from the distributed data network.

15 Claims, 4 Drawing Sheets

ENHANCED CELLULAR NETWORK ARCHITECTURE

BACKGROUND OF THE PRESENT INVENTION

1. Field of the Invention

The present invention relates generally to cellular telecommunications systems and methods, and specifically to storing and retrieving subscriber data associated with mobile subscribers within a cellular network.

2. Background of the Present Invention

Cellular telecommunications is one of the fastest growing and most demanding telecommunications applications. Today it represents a large and continuously increasing percentage of all new telephone subscriptions around the world. In the near future, service providers will begin to roll out third generation cellular networks, which will offer new and customized features to mobile subscribers. However, the current cellular network architecture lacks the flexibility needed to be able to cope with the vast amount of data and operations expected due to third generation cellular networks.

For example, since all subscriber data is currently centrally stored in the Home Location Register (HLR) with copies to the serving Mobile Switching Center/Visitor Location Register (MSC/VLR), introducing new and customized features may require enormous amounts of additional storage space in the HLR and MSC/VLR and may require further standardization of the HLR and MSC/VLR. This storage process is inflexible and extremely costly, making it difficult to introduce new subscriber data. Thus, as the amount of data increases, neither the HLR nor the MSC/VLR may be the best place to store all of the subscriber data.

In addition, the Signaling System No. 7 (SS7) network, which is the existing network used to transport the subscriber data between the HLR and the MSC/VLR, is expensive and time-consuming. Thus, SS7 may not be the best way to transfer the subscriber data in the future. In sum, as a result of the increase in the number of services and associated subscriber data, the impact on the HLR and MSC/VLR nodes will create bottlenecks in the cellular network, which will eventually lead to a decline in network performance.

SUMMARY OF THE INVENTION

The present invention is directed to telecommunications systems and methods for an enhanced cellular network architecture to distributively store subscriber data. In addition to or in place of the current subscriber data, a new element can be stored in the HLR. This new element references one of a plurality of databases distributed throughout a data network, such as an Internet Protocol (IP) network. These databases contain additional subscriber data for mobile subscribers. The elements inform the serving MSC/VLR which database to access in order to obtain the additional subscriber data.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
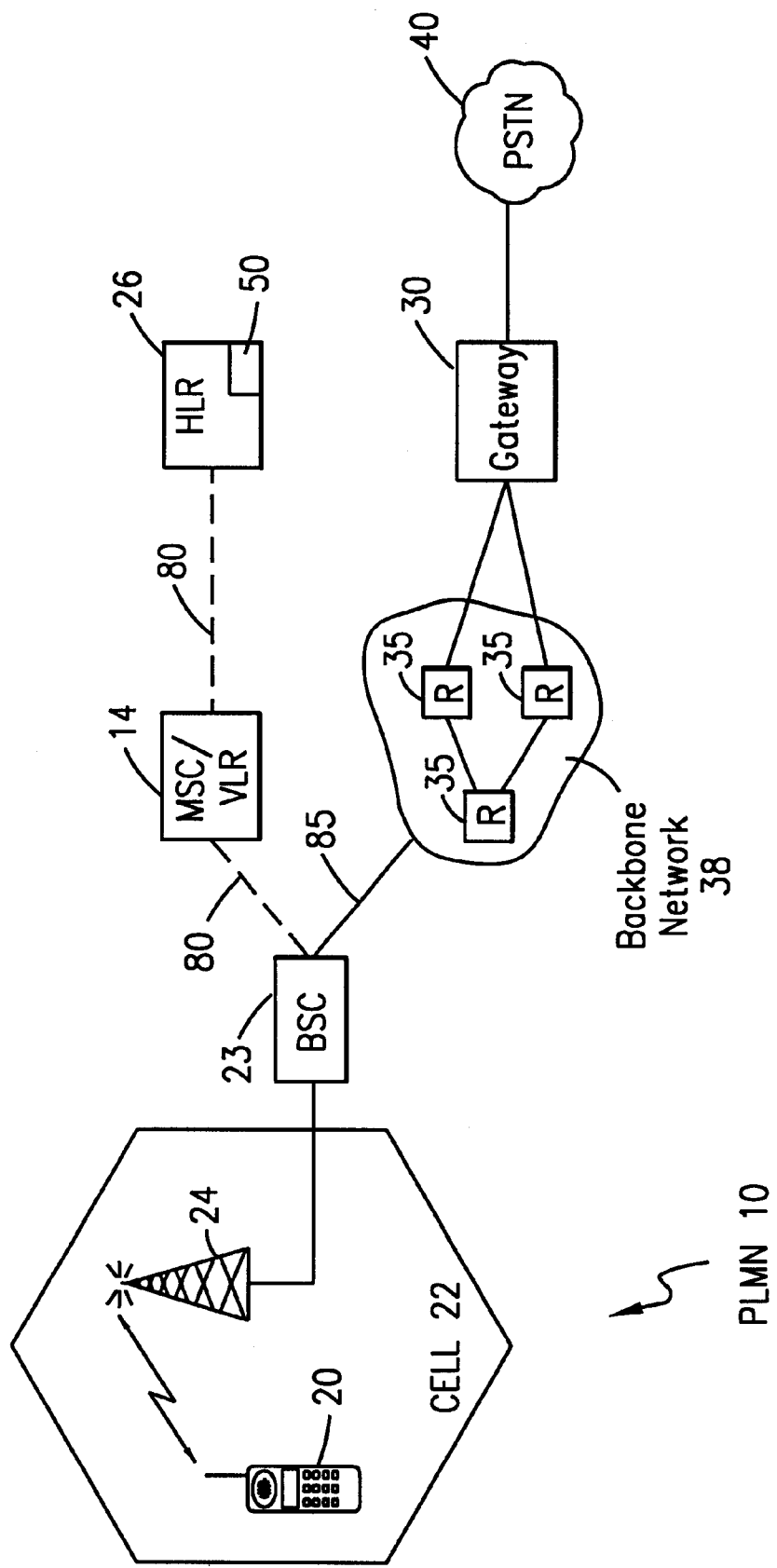
FIG. 1 is a block diagram illustrating a conventional third generation cellular network.

With reference now to FIG. 1 of the drawings, there is illustrated a conventional third generation cellular network 10, such as a Global System for Mobile Communications (GSM) Public Land Mobile Network (PLMN), which in turn is composed of at least one Mobile Switching Center (MSC) and integrated Visitor Location Register (VLR) (MSC/VLR) 14. The MSC/VLR 14 provides a connection of signaling information between a Mobile Station (MS) 20 and the PLMN 10. The MS 20 is the physical equipment, e.g., a car phone or other portable phone, used by mobile subscribers to communicate with the cellular network 10, each other, and users outside the subscribed network, both wireline and wireless.

The MSC/VLR 14 is in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to a cell 22 for which it is responsible. It should be understood that the BSC 23 may be connected to several BTS's 24, and may be implemented as a stand-alone node or integrated with the MSC/VLR 14.

The BSC 23 and MSC/VLR 14 are connected through a signaling connection (shown by dotted line 80), which transmits signaling information related to mobile subscriber services, such as establishing call connections and registering MSs 20 with the MSC/VLR 14. The speech and data for calls to the MS 20 are transmitted through a speech connection (shown by solid line 85) in the PLMN 10, which goes directly between a Gateway 30 and the BSC 23 via a backbone network 38 containing routers 35. The speech connection can use any type of network to route the speech, such as the Internet Protocol (IP) network or Asynchronous Transfer Mode (ATM) network. The Gateway 30 also provides the connection to the Public Switched Telephone Network (PSTN) 40.

With further reference to FIG. 1, the PLMN Service Area or cellular network 10 also includes a Home Location Register (HLR) 26, which is a database maintaining all subscriber data 50, e.g., user profiles, current location information, International Mobile Subscriber Identity (IMSI) numbers, and other administrative information, for subscribers registered within that PLMN 10. The HLR 26 may be co-located with a given MSC/VLR 14, integrated with the MSC/VLR 14, or alternatively can service multiple MSC/VLRs 14.

When an MS 20 first registers with a serving MSC/VLR 14, which could be in the home PLMN 10 or within a visiting PLMN (not shown), the MS 20 sends a location updating message to the MSC/VLR 14. In response, the MSC/VLR 14 sends an update location message to the HLR 26, which returns the subscriber data 50 associated with the MS 20 back to the MSC/VLR 14 in an Insert Subscriber Data message. This subscriber data 50 is stored in the MSC/VLR 14.

However, with the deployment of third generation cellular networks, storage of the subscriber data 50 within the HLR 26 and the MSC/VLR 14 may not be feasible or efficient due to the amount of new information required. Therefore, with reference now to FIG. 2 of the drawings, in accordance with embodiments of the present invention, a new cellular network architecture can be implemented, in which the subscriber data 50 is distributively stored in at least one database 60 within a data network 65, such as an Internet Protocol (IP) network. All of the subscriber data 50 normally stored in the HLR 26, except for routing information, can be stored in these external databases 60. Routing information preferably remains in the HLR 26 for quick and efficient routing of calls. Alternatively, only select subscriber data 50, such as newly added subscriber data or subscriber data related to features provided by third generation cellular networks, such as screening lists, can be stored in these external databases 60.

When subscriber data 50 is removed to or added to one of the external databases 60, a new element 55, which can include at least an IP address associated with the external database 60, is stored in the HLR 26. Thus, when the serving MSC/VLR 14 sends the update location message to the HLR 26, the HLR 26 returns this element 55 to the MSC/VLR 14, which uses this element 55 to retrieve a copy of the subscriber data 50 from the external database 60.

Figure 2:
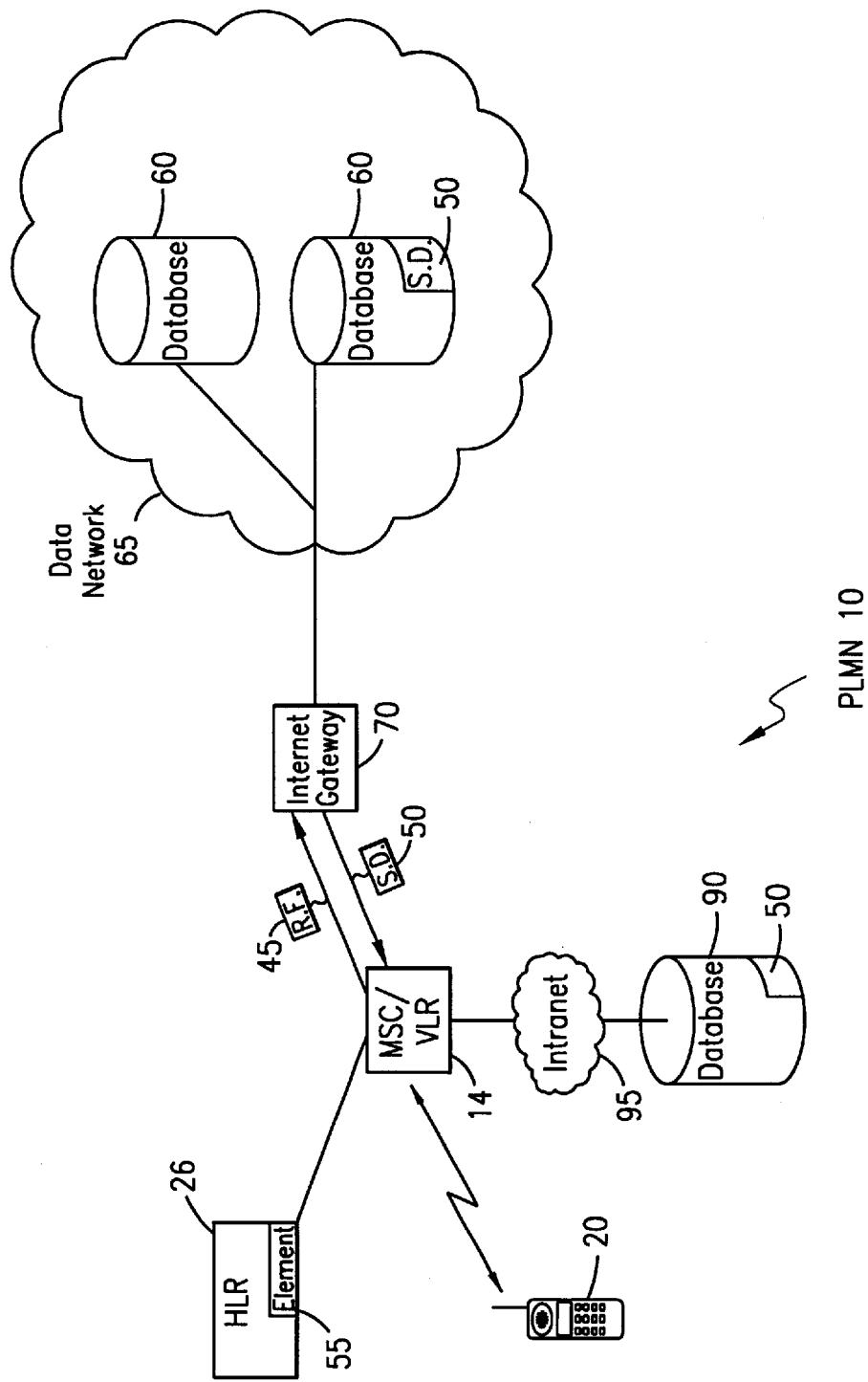
FIG. 2 is a block diagram illustrating a new cellular network architecture in accordance with embodiments of the present invention.
Figure 3:
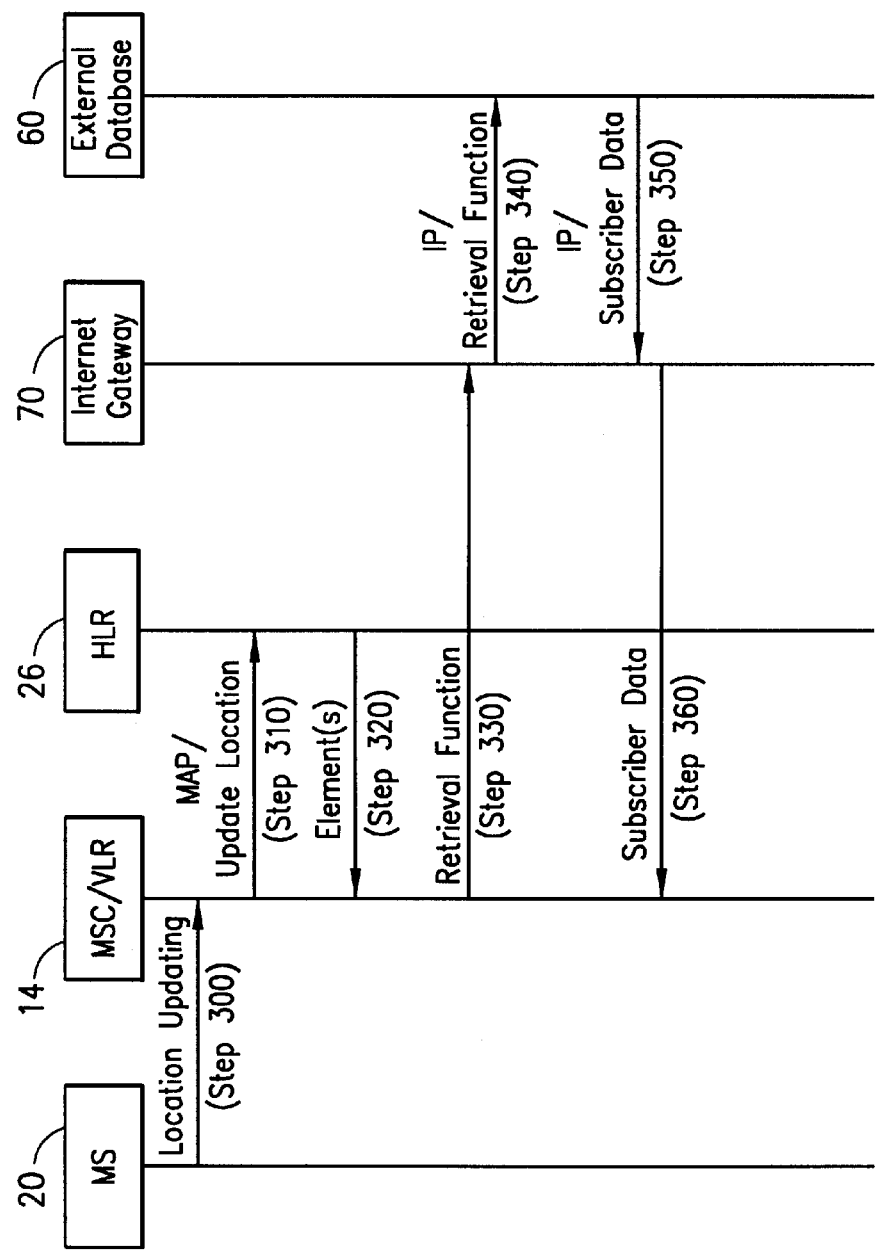
FIG. 3 is a signaling diagram illustrating the signaling involved in the new cellular network architecture.

For example, with reference now to the signaling diagram shown in FIG. 3 of the drawings, which will be described in connection with FIG. 2 of the drawings, when the MS 20 sends the location updating message to the MSC/VLR 14 (step 300), which in turn, sends the update location message to the HLR 26 (step 310), the HLR 26 returns subscriber data 50 for the MS 20 in a Mobile Application Part (MAP) message, along with one or more elements 55 if additional subscriber data 50 is stored in external databases 60 (step 320). The element 55 typically includes at least the IP address for the database 60, along with a pointer to a memory element within the database 60 storing the subscriber data 50.

Thereafter, the MSC/VLR 14 can access the database 60 to retrieve the additional subscriber data 50 by sending a retrieval function message 45 to the database 60 via an Internet Gateway 70 (step 330). It should be understood that an Internet Gateway 70 is not needed if the MSC/VLR 14 is part of a local area network (LAN) having an interface to the IP network 65. Alternatively, the Internet Gateway 70 could be a part of the MSC/VLR 14.

The Internet Gateway 70 provides IP access and routes the retrieval function message 45 as IP packets through the data network 65 to the appropriate database 60, using the IP address (step 340). When the retrieval function message 45 reaches the external database 60, the retrieval function message 45 access the database 60 to retrieve the subscriber data 50 from the database 60. Thereafter, this subscriber data 50 is transmitted back through the data network 65 as IP packets to the Internet Gateway 70 (step 350). The Internet Gateway 70 converts the IP packets back to the additional subscriber data 50 and returns the additional subscriber data 50 to the MSC/VLR 14 (step 360).

The MSC/VLR 14 may request the subscriber data 50 from the external database(s) 60 immediately or as needed. For example, when the MS 20 makes a mobile originating call and the MSC/VLR 14 determines that subscriber data 50 stored in the external database 60 is needed, the MSC/VLR 14 can request the subscriber data 50 from the external database 60, using the element 55 downloaded from the HLR 26, at call setup.

Since these databases 60 are preferably owned and maintained by the mobile subscriber's service provider, the mobile subscriber should be able to contact the service provider to create, modify, customize or remove any feature or application stored on these databases 60. For example, a screening list for a mobile subscriber may be stored on one of these remote external databases 60. In preferred embodiments, this screening list may be accessed by the mobile subscriber, using an authorized web-based interface, to easily edit the screening list within operator defined limits.

For example, the mobile subscriber could dial up an Internet Service Provider (ISP) (not shown) and access the web page (not shown) of the service provider of the mobile subscriber through the data network 65. From here, the service provider can retrieve the screening list from the database 60, display the screening list to the mobile subscriber and allow the mobile subscriber to edit the screening list. Once edited, the service provider can write the edited version of the screening list to the database 60, update the HLR 26, if necessary, and determine charging and billing information based on the edited version of the screening list.

Preferably, the MSC/VLR 14 is also connected to a dedicated internal database 90 through an intranet 95. This dedicated internal database 90 can be used to store a copy of the subscriber data 50 fetched from the external database 60, similar to the conventional process of storing a copy of the HLR 26 subscriber data 50 in the MSC/VLR 14. Therefore, instead of requiring the MSC/VLR 14 to utilize valuable storage space to store a copy of the subscriber data 50 fetched from the external database 60 or requiring the MSC/VLR 14 to request this subscriber data 50 every time it is needed, this subscriber data 50 can be stored in the internal database 90.

Figure 4:
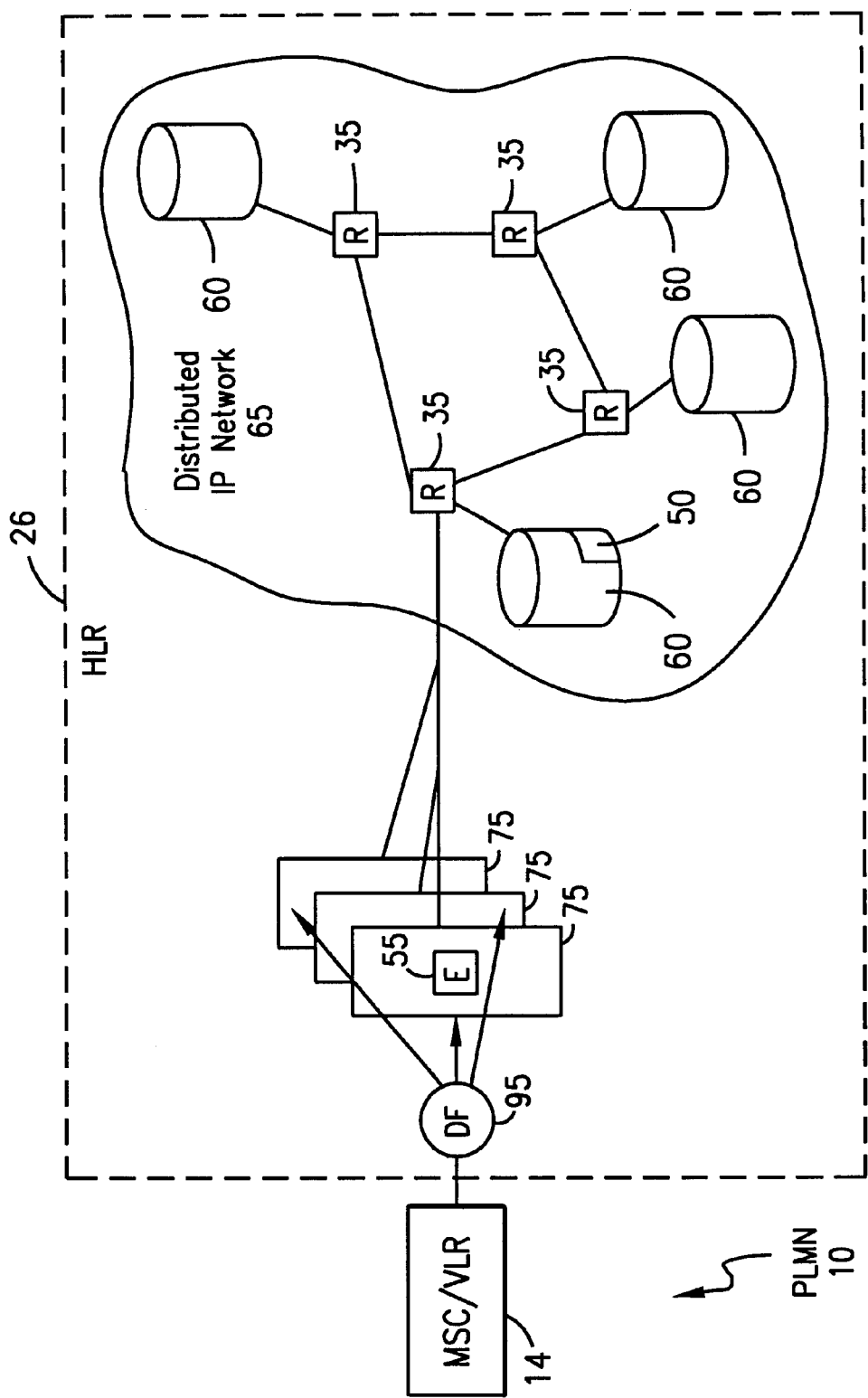
FIG. 4 is a block diagram illustrating a new MSC/VLR platform to execute applications within the new cellular network architecture.

With reference now to FIG. 4 of the drawings, as discussed hereinbefore, an alternative way of distributively storing subscriber data 50 is shown. In FIG. 4, the HLR 26 is shown as a combination of a distributed IP network 65 containing a plurality of databases 60 interconnected by routers 35 and Gateway nodes 75 that connect the PLMN 10 to the distributed IP network 65. Within the Gateway nodes 75, various subscriber data 50, such as location information and element(s), can be stored. However, most of the subscriber data 50 is stored in the databases 60 within the distributed IP network. A distribution function 95 can also be included in the HLR 26 to identify which of the Gateway nodes 75 stores the location information and element(s) 55 for a particular mobile subscriber.

Therefore, when the MSC/VLR 14 sends an update location message to the HLR 26 for a particular mobile subscriber, the distribution function 95 determines which Gateway node 75 stores the requested element(s) 55 and location information for the particular subscriber and updates the location information with the MSC/VLR 14 address. Thereafter, the HLR 26 can either return the element(s) 55 to the MSC/VLR 14 for later retrieval of subscriber data 50 by the MSC/VLR 14 or use the element(s) 55 to access the appropriate database(s) 60 to retrieve the additional subscriber data 50 and return this additional subscriber data to the MSC/VLR 14.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for storing and retrieving subscriber data associated with a mobile subscriber within a third generation cellular network, comprising:

at least one base station and at least one mobile switching center connected to each other via only a signaling connection;

a gateway connected directly to said base station via a speech connection;

at least one external database external to said cellular network and for storing at least a portion of said subscriber data associated with said mobile subscriber; and a home location register within said cellular network and for storing an element associated with said external database, said home location register sending said element to said at least one mobile switching center in response to receiving an update location message from said at least one mobile switching center, said at least one mobile switching center using said element to directly access said external database to retrieve said portion of said subscriber data stored in said external database.

2. The telecommunications system of claim 1, wherein said external database is within a data network.

3. The telecommunications system of claim 2, wherein said data network is an Internet Protocol network.

4. The telecommunications system of claim 3, further comprising:

an Internet Gateway for connecting said cellular network to said Internet Protocol network.

5. The telecommunications system of claim 1, further comprising:

an interface to said external database for editing said subscriber data stored in said external database by said mobile subscriber.

6. The telecommunications system of claim 1, further comprising:

at least one internal database within said cellular network for receiving said subscriber data from said at least one external database and storing said subscriber data therein.

7. The telecommunications system of claim 6, wherein said internal database is connected to said mobile switching center via an intranet.

8. A home location register for storing subscriber data associated with a mobile subscriber, said home location register being within a third generation cellular network, comprising:

at least one database within a data network for storing said subscriber data associated with said mobile subscriber;

at least one gateway for connecting said data network to a cellular network and for storing an element associated with said database; and a distribution function within said cellular network for identifying a select one of said at least one gateway that stores said element;

wherein said distribution function is connected to at least one mobile switching center within said third generation cellular network, said at least one mobile switching center being connected to at least one base station via only a signaling connection.

9. The telecommunications system of claim 8, wherein said data network further includes routers for interconnecting all of said at least one database.

10. A method for storing and retrieving subscriber data associated with a mobile subscriber within a cellular network having at least one base station and at least one mobile switching center connected to each other via only a signaling connection and a gateway connected directly to said base station via a speech connection, said method comprising the steps of:

storing an element associated with at least a portion of said subscriber data associated with said mobile subscriber in a home location register, said element identifying at least one external database external to said cellular network that stores said portion of said subscriber data;

sending said element from said home location register to said at least one mobile switching center in response to receipt of an update location message at said home location register from said at least one mobile switching center; and accessing said at least one external database, directly by said at least one mobile switching center, to retrieve said portion of said subscriber data associated with said mobile subscriber, using said element.

11. The method of claim 10, wherein said step of accessing further comprises the step of:

accessing said external database using an Internet Protocol address for said external database included within said element.

12. The method of claim 11, wherein said step of accessing further comprises the step of:

retrieving said subscriber data from said external database using a pointer to a memory element within said external database that stores said subscriber data, said pointer being included within said element.

13. The method of claim 10, further comprising the step of:

storing at least a part of said subscriber data retrieved from said external database within an internal database within said cellular network.

14. The method of claim 13, wherein said internal database is connected to said mobile switching center via an intranet.

15. A method for storing subscriber data associated with a mobile subscriber within a home location register within a third generation cellular network, comprising the steps of:

storing said subscriber data within at least one database within a data network, said at least one database being included within said home location register;

providing at least one gateway within said home location register for connecting said data network to a cellular network;

storing an element identifying said at least one database that stores said subscriber data within a select one of said at least one gateway; and identifying said select gateway that stores said element using a distribution function within said home location register and within said cellular network, said distribution function being connected to at least one mobile switching center within said third generation cellular network, said at least one mobile switching center being connected to at least one base station via only a signaling connection.

\* \* \* \* \*